United States Patent [19]

Yamanashi et al.

[11] Patent Number: 5,413,657
[45] Date of Patent: May 9, 1995

[54] METHOD OF MAKING COMPENSATOR FOR LIQUID CRYSTAL DISPLAY

[75] Inventors: Teruaki Yamanashi, Hiratsuka; Shinichirou Suzuki, Chigasaki; Yoshio Tsujimoto, Ohta; Toshikazu Kiyohara, Yokohama, all of Japan

[73] Assignee: Nippon Oil Company, Limited, Tokyo, Japan

[21] Appl. No.: 72,324

[22] Filed: Jun. 3, 1993

[30] Foreign Application Priority Data

Jun. 3, 1992 [JP] Japan .................. 4-184275

[51] Int. Cl.⁶ .............................................. G02F 1/13
[52] U.S. Cl. ......................................... 156/235; 428/1; 359/73; 359/103; 359/106
[58] Field of Search ................... 428/1; 156/235, 324; 252/299.01; 359/73, 103, 106

[56] References Cited

U.S. PATENT DOCUMENTS

| | | | |
|---|---|---|---|
| 4,293,435 | 10/1981 | Portugall et al. | 252/299.01 |
| 4,385,806 | 5/1983 | Fergason | 350/347 R |
| 4,443,065 | 4/1984 | Funada et al. | 350/335 |
| 4,693,562 | 9/1987 | Hasegawa et al. | 350/337 |
| 4,702,558 | 10/1987 | Coles et al. | 350/330 |
| 4,727,047 | 2/1988 | Bozller | 437/89 X |
| 4,738,811 | 4/1988 | Hara et al. | 252/211.12 |
| 4,744,918 | 5/1988 | Heppke et al. | 252/299.61 |
| 4,828,758 | 5/1989 | Gillberg-LaForce et al. | 252/582 |
| 4,965,242 | 10/1990 | DeBoer | 503/227 X |
| 4,973,373 | 11/1990 | Hashimoto | 156/324 X |
| 4,995,705 | 2/1991 | Yoshinaga et al. | 350/350 |
| 5,073,534 | 12/1991 | Harrison | 503/227 X |
| 5,079,214 | 1/1992 | Long | 503/227 X |
| 5,081,221 | 1/1992 | Watanabe | 528/308 |
| 5,110,623 | 5/1992 | Yuasa | 427/162 X |
| 5,139,879 | 8/1992 | Aharoni | 428/422 X |
| 5,145,546 | 9/1992 | Yuasa | 156/324 |
| 5,150,235 | 9/1992 | Haim et al. | 359/68 |
| 5,166,126 | 11/1992 | Harrison | 503/227 X |
| 5,193,020 | 3/1993 | Shiozaki | 359/73 X |
| 5,206,749 | 4/1993 | Zavrackey | 359/59 X |
| 5,235,449 | 8/1993 | Imazeki | 359/63 X |
| 5,258,320 | 11/1993 | Zavracky | 437/909 X |
| 5,262,379 | 11/1993 | Bailey | 503/227 X |
| 5,298,199 | 3/1994 | Hirose | 264/2.6 |

FOREIGN PATENT DOCUMENTS

| | | |
|---|---|---|
| 244288 | 11/1987 | European Pat. Off. . |
| 292244 | 11/1988 | European Pat. Off. . |
| 380338 | 8/1990 | European Pat. Off. . |
| 62-238538 | 10/1987 | Japan . |
| 63-198506 | 2/1990 | Japan . |
| 63-219801 | 3/1990 | Japan . |
| 1462978 | 1/1977 | United Kingdom . |

OTHER PUBLICATIONS

Chemical Abstract No. 98:161429 k; Chiellini, et al. (1983) "Chiral Liquid Crystal Polymers. 3. Structurally Ordered Thermotropic Polyesters of Optically Active Propylene Glycol Ethers", *Polym. Bull.* 9, 19.

Meredith, et al. (1982) "Optical and Nonlinear Optical Characterization of Molecularly Doped Thermotropic Liquid Crystalline Polymers", *Macromolecules* 15, 1385–1389.

Jerphagnon, et al. (1970) "Maker Fringes: A Detailed Comparison of Theory and Experiment for Isotropic and Uniaxial Crystals", *Journal of Applied Physics* 41, 1667–1681.

*Primary Examiner*—David A. Simmons
*Assistant Examiner*—Charles Rainwater
*Attorney, Agent, or Firm*—Scully, Scott, Murphy & Presser

[57] ABSTRACT

A compensator for a liquid crystal display device is made by applying a solution containing a liquid crystalline polymer onto an orientation substrate, then allowing the liquid crystalline polymer to be oriented, and thereafter transferring the resulting layer of the liquid crystalline polymer on the orientation substrate onto a light transmitting substrate, said solution containing the liquid crystalline polymer having incorporated therein 0.01% to 10% by weight of a surface active agent relative to the liquid crystalline polymer.

8 Claims, 2 Drawing Sheets

5,413,657

METHOD OF MAKING COMPENSATOR FOR LIQUID CRYSTAL DISPLAY

BACKGROUND OF THE INVENTION

The present invention relates to a method of making a compensator for a liquid crystal display device and more particularly to a method of making a compensator for a liquid crystal device which is intended to improve the display quality, for example, prevent the coloration of liquid crystal display, or enlarge the viewing angle characteristic.

Liquid crystal display occupies an important position in the display field because of such characteristics thereof as being driven at a low voltage, light weight and low cost. For example, a super-twisted nematic (hereinafter referred to simply as "STN") liquid crystal display of a simple matrix driving type permits a large screen display based on a multiplex driving dot matrix system and has such characteristics as being high in contrast and wide in viewing angle as compared with the conventional twisted nematic (TN) type liquid crystal display. Because of these characteristics, the STN liquid crystal display is widely used in the field of liquid crystal displays requiring a large screen display such as personal computers, word processors and various data terminals. However, since the STN method utilizes a birefringence effect, the coloration in yellow or blue has been unavoidable. The display in such a colored mode is seriously disadvantageous in that not only it is undesirable on the user side but also cannot realize a desired color display.

Also in the case of a liquid crystal display using a thin film transistor (simply "TFT" hereinafter) which is a typical example of an active matrix driving type, there arises a serious drawback of the same coloration as that mentioned above when the cell gap is made smaller for the purpose of improving the response speed and the viewing angle characteristic.

Further, both such simple matrix type and active matrix type are disadvantageous in that a viewing angle range permitting a satisfactory image is limited, which is peculiar to the liquid crystal display.

As an optical element for overcoming such drawbacks of the liquid crystal display, the present inventors have previously proposed a compensator for a liquid crystal display constituted by a liquid crystalline polymer with a twisted nematic structure fixed (Japanese Patent Laid Open No. 87720/1991). Further, as a simpler manufacturing method high in mass productivity for such liquid crystal display compensator, the present inventors have also proposed a manufacturing method in which a liquid crystalline polymer layer formed on an orientating substrate is transferred onto light transmitting substrate (Japanese Patent Laid Open No. JP4-57017A).

Such optical element is required to have a high degree of uniformity in its film thickness in all area of the compensator. In other words, it is required that there be little unevenness in the film thickness in all area of the compensator. Also in the above manufacturing method proposed by the present inventors, the attainment of a high degree of uniformity remains as an important subject to be achieved in practising the method on an industrial scale.

It is the object of the present invention to provide a method of making a compensator for a liquid crystal display device, comprising transferring a liquid crystalline polymer layer formed on an orientating substrate onto a light transmitting substrate, which method can attain a high degree of uniformity in film thickness.

SUMMARY OF THE INVENTION

The present invention relates to a method of making a compensator for a liquid crystal display device, which method comprises applying a solution containing a liquid crystalline polymer onto an orientation substrate, then allowing the liquid crystalline polymer to be oriented and thereafter transferring the liquid crystalline polymer layer on the orientation substrate onto a light transmitting substrate, the said solution containing the liquid crystalline polymer having incorporated therein a surface active agent in an amount of 0.01 to 10 wt % relative to the liquid crystalline polymer.

By using the method of the present invention it is made possible to attain a film thickness uniformity of within ±1%.

[Explanation of Reference Numerals]

Figure 1:
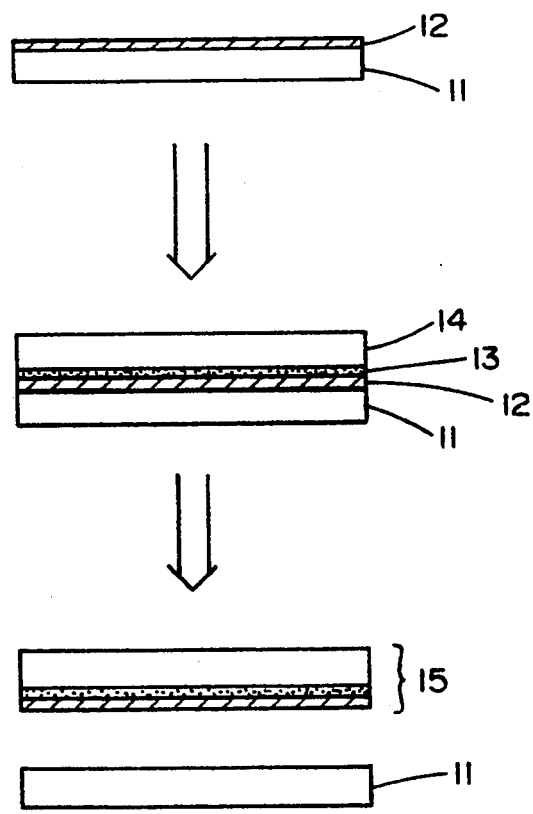
FIG. 1 is a diagram explaining a method of making a compensator for a liquid crystal display device according to the present invention.

11: orientation substrate
12: compensation layer (liquid crystalline polymer layer)
13: pressure-sensitive adhesive layer
14: light transmitting substrate
15: compensator of the present invention
21: upper polarizing plate
22: compensator of the present invention
23: STN liquid crystal cell
24: lower polarizing plate
25: liquid crystal cell
31: transmission axis of the lower polarizing plate
32: transmission axis of the upper polarizing plate
33: rubbing direction of a lower electrode substrate
34: rubbing direction of an upper electrode substrate
35: molecular orientation direction of the compensation layer surface which is in contact with the upper electrode substrate
36: molecular orientation direction of the compensation layer surface which is in contact with the upper polarizing plate
$3a$: molecular twist angle of the liquid crystal cell
$3b$: molecular twist angle of the compensation layer
$3c$: angle between 31 and 33
$3d$: angle between 34 and 35
$3e$: angle between 31 and 32
$3f$: angle between 32 and 36

DETAILED DESCRIPTION OF THE INVENTION

Referring first to FIG. 1 as an example, the manufacturing method of the present invention will now be described. In the present invention, first a solution of a liquid crystalline polymer containing a surface active agent is applied onto an orientation substrate 11 capable of orientating the liquid crystalline polymer. After removal of a solvent used, a heat treatment is performed at a predetermined temperature to orient the liquid crystalline polymer, followed by cooling to fix the oriented structure, thereby allowing a compensation layer 12 to be formed. Next, a light transmitting substrate 14 is stuck on the said compensation layer through an adhesive or a pressure-sensitive adhesive 13. Then, the compensation layer is peeled off at the interface between it and the orientation substrate and is transferred to the light transmitting substrate side, whereby a compensator 15 for a liquid crystal display device according to the present invention can be produced.

As the orientation substrate used in the present invention there may be used any substrate if only it is capable of orienting the liquid crystalline polymer used in the invention and possesses predetermined heat resistance and solvent resistance and further possesses releasability which permits the compensation layer to be released from the substrate. As to the orienting ability and required resistance to heat and to solvents and releasability, it is impossible to make reference thereto sweepingly because they differ depending on the kind and properties of the liquid crystalline polymer used. But as typical examples of the orientation substrate used in the invention there are mentioned sheet- or plate-like substrates such as metallic sheets or plates formed of aluminum, iron or copper, ceramic sheets or plates, enameled sheets or plates, and glass sheets or plates, each having thereon an alignment film such as a known polyimide or polyvinyl alcohol film which has been subjected to a rubbing treatment or an obliquely vapor-deposited film of silicon oxide. As other examples there are mentioned substrates obtained by subjecting the surfaces of films or sheets of the following plastic materials directly to a rubbing treatment: polyimides, polyamide-imides, polyether imides, polyamides, polyether ether ketones, polyether ketones, polyketone sulfides, polyether sulfones, polysulfones, polyphenylene sulfides, polyphenylene oxides, polyethylene terephthalate, polybutylene terephthalate, polyacetals, polycarbonates, acrylic resins, polyvinyl alcohols, cellulosic plastics, epoxy resins, phenolic resins, as well as substrates comprising these films or sheets and an alignment film formed thereon such as a polyimide or polyvinyl alcohol film which has been subjected to a rubbing treatment. Of these plastic films or sheets, some highly crystalline ones come to have a liquid crystalline polymer orienting ability by being stretched only uniaxially. Such highly crystalline plastic films or sheets are employable directly as orientating substrates without being subjected directly to a rubbing treatment or without forming thereon a rubbed polyimide film as an alignment film. Examples of such plastic films or sheets include films or sheets of polyimides, polyether imides, polyether ether ketones, polyether ketones, polyphenylene sulfides and polyethylene terephthalate.

Particularly preferred orientation substrates are glass or metallic sheets or plates having thereon a rubbed polyimide or polyvinyl alcohol layer, as well as films or sheets of polyimides, polyethylene terephthalate, polyphenylene sulfides, polyether ether ketones and polyvinyl alcohols.

A solution of a liquid crystalline polymer containing a surface active agent is applied onto the orientating substrate exemplified above, then dried and heat-treated to form a uniform, twisted nematic structure of monodomain, followed by cooling to fix the thus-oriented structure without impairing the orientation in the state of liquid crystal, thereby forming a compensation layer on the substrate. A preferred liquid crystalline polymer in the present invention is a composition comprising a liquid crystalline polymer which exhibits a uniform nematic orientation of monodomain and which permits the state of such orientation to be fixed easily and a predetermined amount of an optically active compound, or an optically active liquid crystalline polymer which exhibits a uniform twisted nematic orientation of monodomain and which permits the state of orientation to be fixed eastly.

First, the former, namely, a composition comprising such nematic liquid crystalline polymer and an optically active compound will now be explained. The liquid crystalline polymer as a base material which exhibits a uniform nematic orientation of monodomain and which permits the state of such orientation to be fixed easily, is required to have the following property as an essential condition. For fixing the nematic orientation stably, when viewed in terms of a phase series of liquid crystal, it is important that there be no crystal phase in a lower temperature region than the nematic phase. If such crystal phase is present, an inevitable passage therethrough at the time of cooling for fixing the orientation results in destruction of the nematic orientation once obtained, thus leading to unsatisfactory transparency and compensating effect. In making the compensator of the present invention, therefore, it is absolutely necessary to use a liquid crystalline polymer having glass phase in a lower temperature region than the nematic phase. This polymer, when an optically active compound is incorporated therein, exhibits a twisted nematic orientation in a liquid crystal state and assumes a glass phase at a temperature below a liquid crystal transition point thereof, so that the twisted nematic structure can be fixed easily. As such polymer there may be used any polymer if only it exhibits a nematic orientation in the state of liquid crystal and assumes a glassy state at a temperature below the liquid crystal transition point thereof. Examples are main chain type liquid crystalline polymers such as polyesters, polyamides, polycarbonates and polyester imides, as well as side chain type liquid crystalline polymers such as polyacrylates, polymethacrylates, polymalonates and polysiloxanes. Particularly, polyesters are preferred in point of easy preparation, superior transparency and orientatability and high glass transition point. Above all, polyesters containing an ortho-substituted aromatic unit as a constituent are most preferred. Polymers containing as a constituent an aromatic unit having bulky substituent group in place of such ortho-substituted aromatic unit or an aromatic unit having fluorine or a fluorine-containing substituent group, are also employable. The "ortho-substituted aromatic unit" as referred to herein means a structural unit with main chain-constituting bonds ortho to each other. Examples are the following catechol, salicylic acid and phthalic acid units, as well as substituted derivatives thereof having substituent groups on their benzene rings:

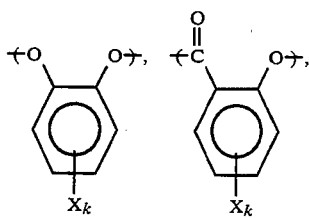
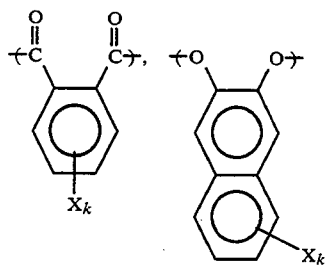

wherein X represents hydrogen, halogen, e.g. Cl or Br, an alkyl or alkoxy group having 1 to 4 carbon atoms, or phenyl, and k is 0 to 2.

The following are particularly preferred:

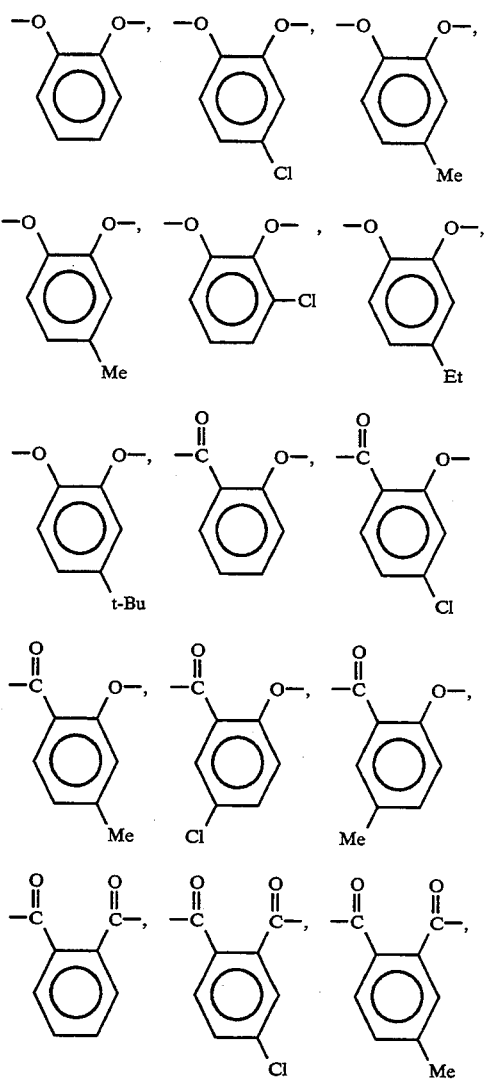

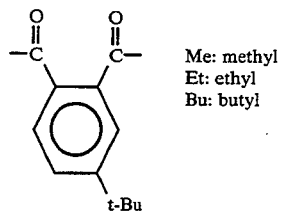

Me: methyl
Et: ethyl
Bu: butyl

Also, as examples of the polyester used preferably in the present invention there are mentioned those containing as repeating units (a) a structural unit (hereinafter referred to as "diol component") derived from a diol and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

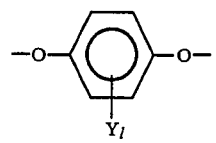

wherein Y represents hydrogen, halogen, e.g. Cl or Br, an alkyl or alkoxy group having 1 to 4 carbon atoms, or phenyl, and l is 0 to 2,

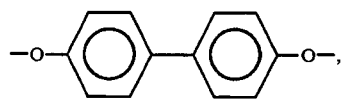

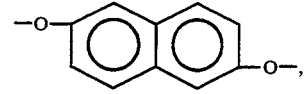

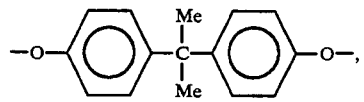

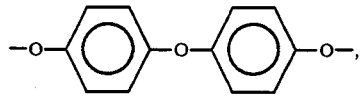

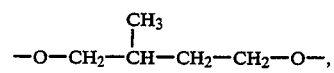

—O—(CH$_2$)$_n$—O—  (n is an integer of 2 to 12), $$-O-CH_2-\overset{CH_3}{\underset{|}{CH}}-CH_2-CH_2-O-,$$

$$-O-CH_2-CH_2-\overset{CH_3}{\underset{|}{CH}}-CH_2-CH_2-CH_2O-,$$

-continued

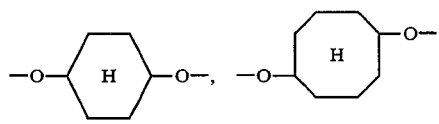

Particularly, the following are preferred:

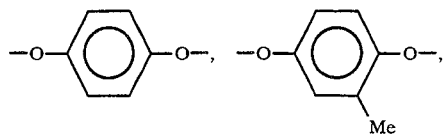

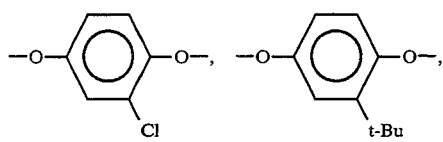

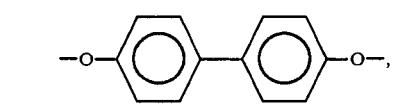

—O—CH₂—CH₂—O—,  —O(CH₂)₄O—,

—O—CH₂—CH(CH₃)—CH₂—CH₂—O—,  —O(CH₂)₆O—.

As examples of the dicarboxylic acid component, the following may be mentioned:

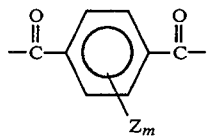

wherein Z represents hydrogen, halogen, e.g. Cl or Br, an alkyl or alkoxy group having 1 to 4 carbon atoms, or phenyl, and m is 0 to 2,

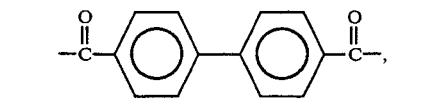

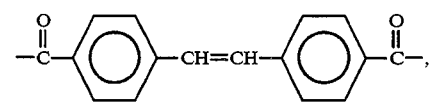

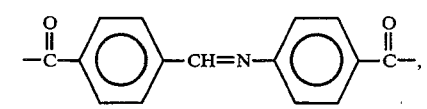

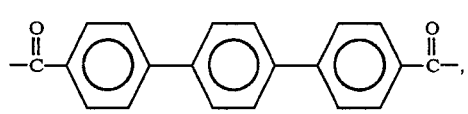

-continued

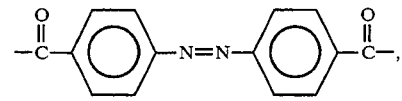

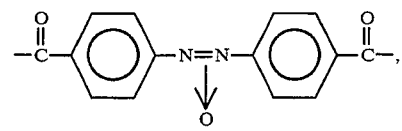

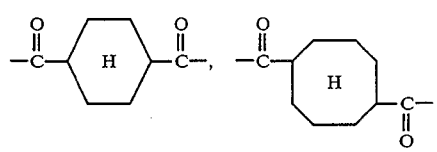

Particularly, the following are preferred:

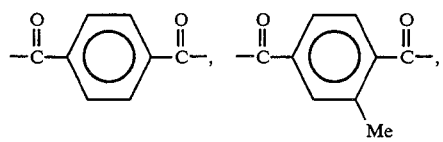

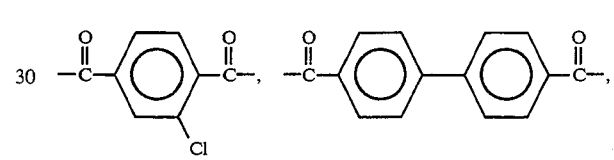

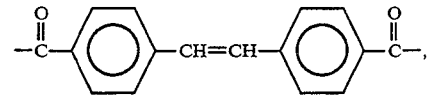

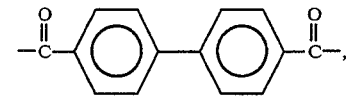

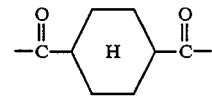

As examples of the hydroxycarboxylic acid component, the following units may be mentioned:

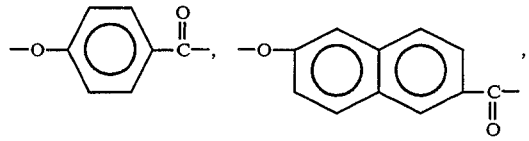

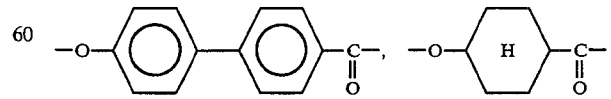

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole %, more preferably 10 to 35 mole %. In the case where the said proportion is smaller than 5 mole %, a crystal phase tends to appear under the nematic phase, so such proportion is not desirable. A proportion larger than 40 mole % is not desirable, either, because the polymer will no longer exhibit liquid crystallinity. The following are typical examples of polyesters which may be used in the present invention:

Polymer consisting essentially of the following structural units:

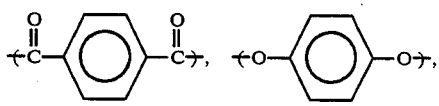
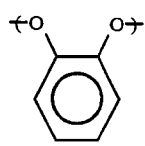

Polymer consisting essentially of the following structural units:

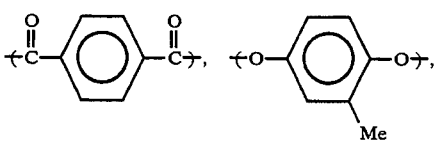
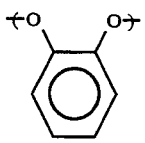

Polymer consisting essentially of the following structural units:

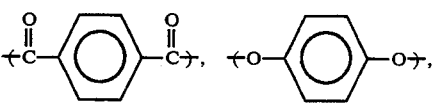
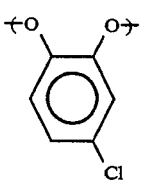

Polymer consisting essentially of the following structural units:

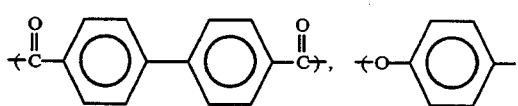

-continued

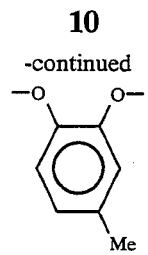

Polymer consisting essentially of the following structural units:

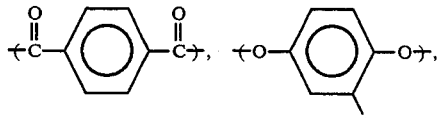
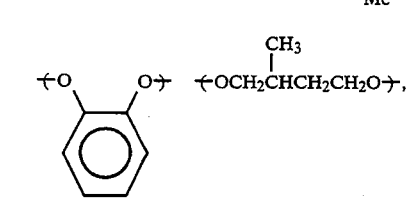

Polymer consisting essentially of the following structural units:

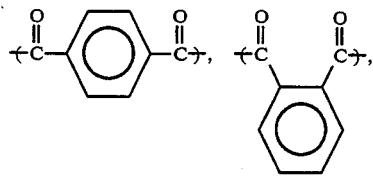

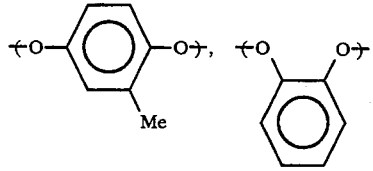

Polymer consisting essentially of the following structural units:

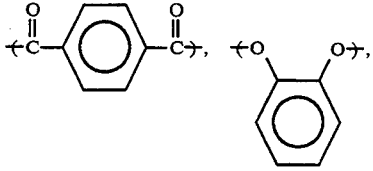

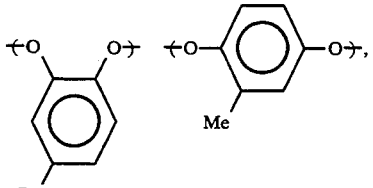

Polymer consisting essentially of the following structural units:

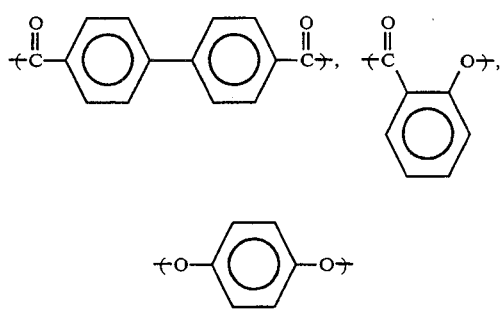

Polymer consisting essentially of the following structural units:

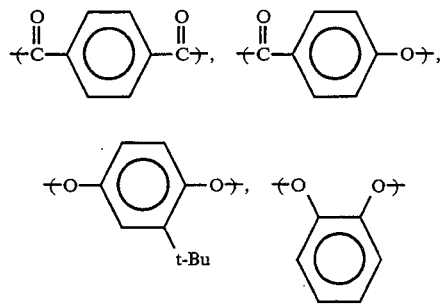

Also preferred are polymers which, in place of ortho-substituted aromatic units, contain as repeating units such bulky substituent-containing aromatic units or aromatic units containing fluorine or fluorine-containing substituents as shown below:

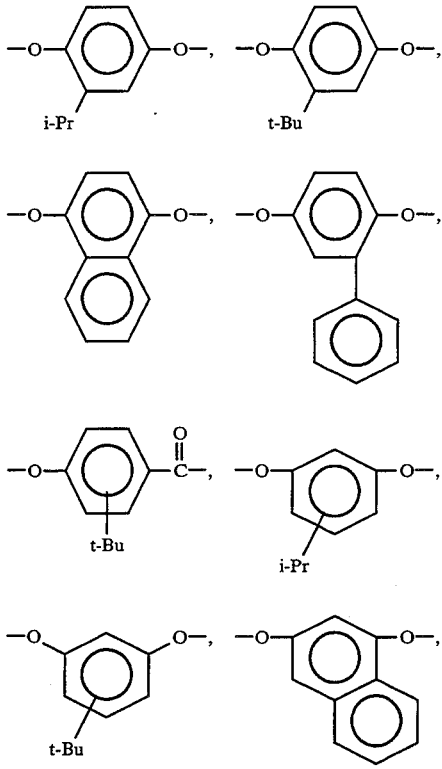

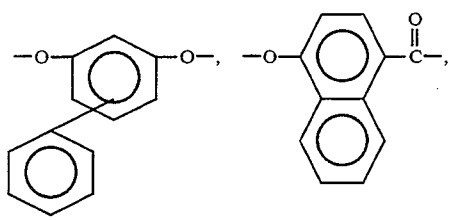

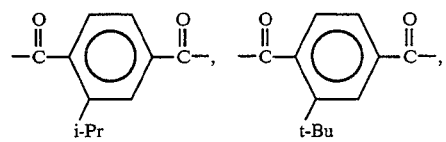

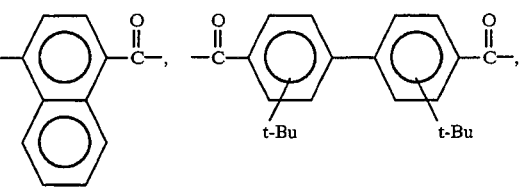

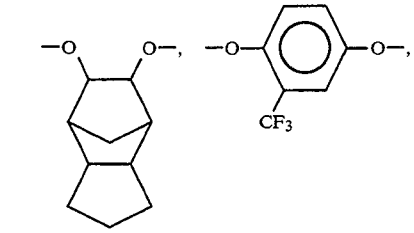

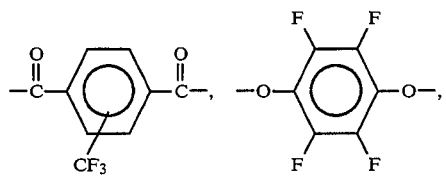

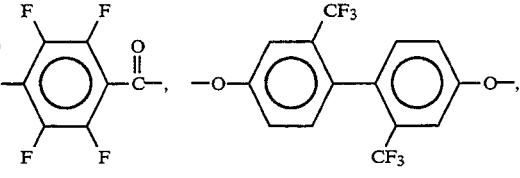

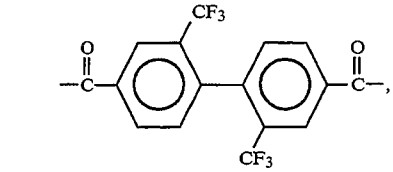

The polymers exemplified above range in molecular weight preferably from 0.05 to 3.0, more preferably 0.07 to 2.0, in terms of inherent viscosity as determined at 30° C. in a solvent, e.g. a mixed phenol/tetrachloroethane [60/40 (weight ratio)] solvent. An inherent viscosity lower than 0.05 is not desirable because the strength of the resulting film of high molecular liquid crystal will be low, while if the inherent viscosity is higher than 3.0, there will arise such problems as the deterioration of orientatability and an increase of the time required for orientation because of too high viscosity during the formation of liquid crystal. The glass transition points of these polyesters are also important, exerting influence on the stability of orientation after the immobilization thereof. The glass transition temperature is usually not lower than 0° C., preferably not lower than 20° C.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are concrete examples:

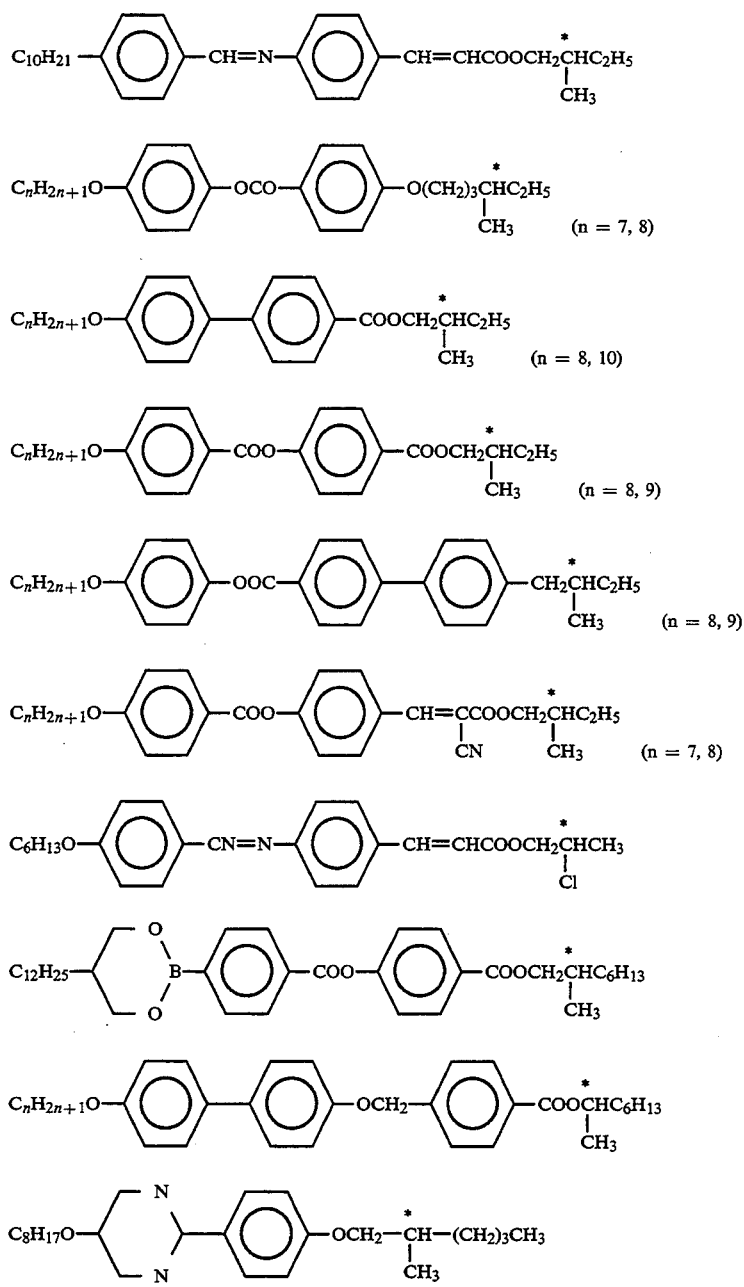

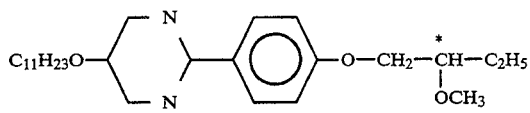

cholesterol derivatives.

As examples of the optically active compound used in the present invention there also may be mentioned optically active polymers. Any high polymer may be used if only it contains an optically active group in the molecule, but when the compatibility with the base polymer is taken into account, it is desirable to use a polymer which exhibits liquid crystallinity. Examples are the following liquid crystalline high polymers having optical activity: polyacrylates, polymethacrylates, polymalonates, polysilolxanes, polyesters, polyamides, polyester amides, polycarbonates, polypeptides, and cellulose. Above all, from the standpoint of compatibility with the nematic liquid crystalline polymer serving as the base, mainly aromatic, optically active polyesters are most preferred. Examples are the following polymers:

Polymer consisting essentially of the following structural units:

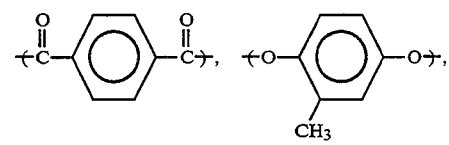

Polymer consisting essentially of the following structural units:

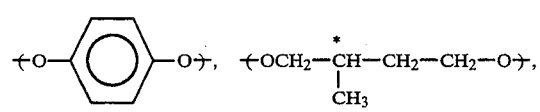

Polymer consisting essentially of the following structural units:

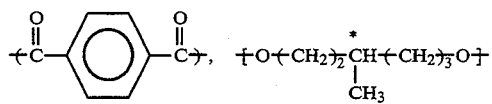

Polymer consisting essentially of the following structural units:

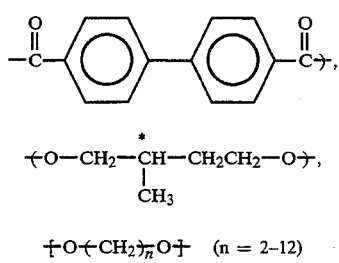

$+O+CH_2\}_n O+$  (n = 2–12)

Polymer consisting essentially of the following structural units:

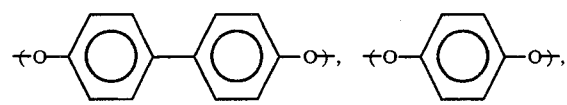

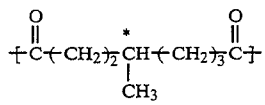

Polymer consisting essentially of the following structural units:

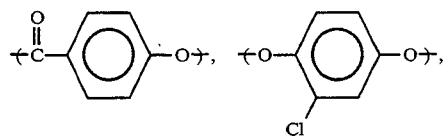

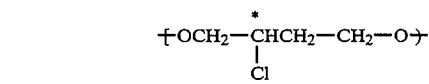

Polymer consisting essentially of the following structural units:

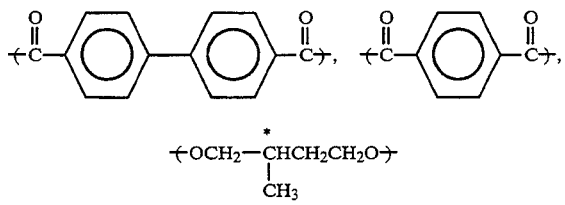

Polymer consisting essentially of the following structureal units:

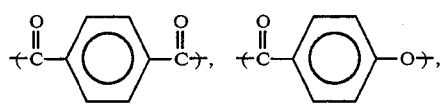

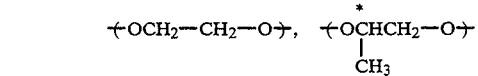

Polymer consisting essentially of the following structural units:

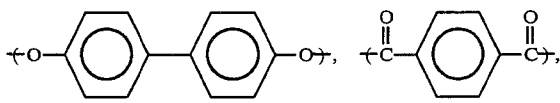

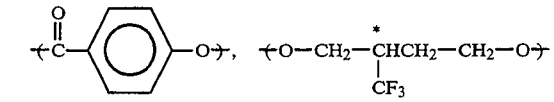

Polymer consisting essentially of the following structural units:

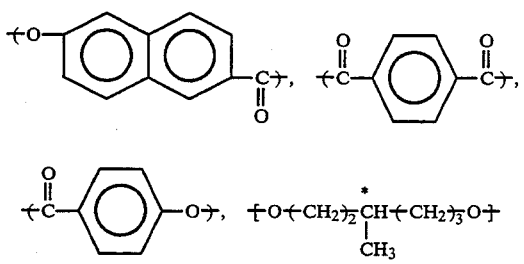

Polymer consisting essentially of the following structural units:

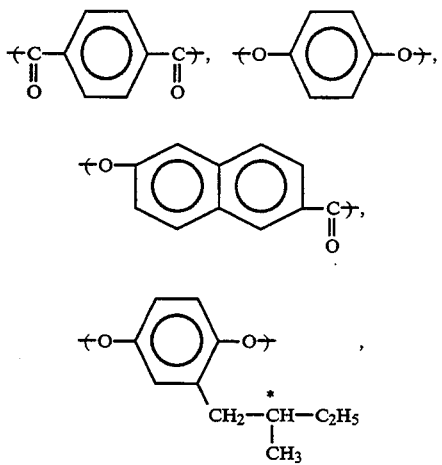

Polymer consisting essentially of the following structural units:

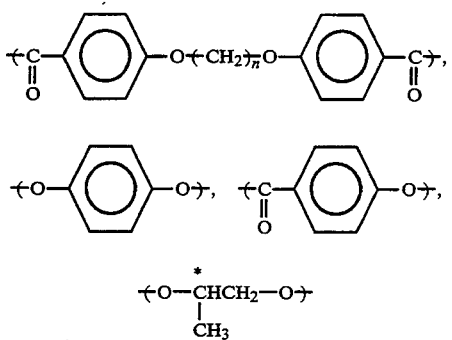

Polymer consisting essentially of the following structural units:

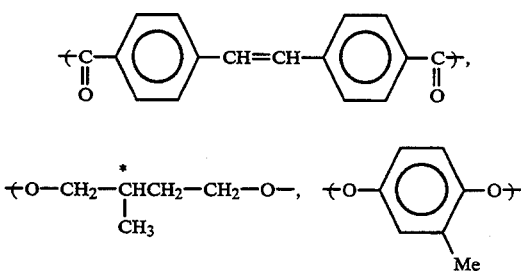

In each of these polymers, the proportion of the unit having an optically active group is usually in the range of 0.5 to 80 mole %, preferably 5 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

In the present invention, the liquid crystalline polymer which exhibits a twisted nematic orientation in the state of liquid crystal and assumes a glassy state at a temperature below the liquid crystal transition point of the polymer, can be prepared by mixing a nematic liquid crystalline polymer and an optically active compound at a predetermined ratio by a solid mixing, solution mixing or melt-mixing method. The proportion of the optically active component in the composition is in the range of preferably 0.1 to 60 wt %, more preferably 0.3 to 40 wt %, although it differs depending on the proportion of optically active groups contained in the optically active compound or the twisting force of the optically active compound for imparting twist to the nematic liquid crystal. If the proportion of the optically active compound is less than 0.1 wt %, it will be impossible to impart a sufficient twist to the nematic liquid crystal, and a proportion thereof greater than 60 wt % will exert a bad influence on the orientation.

The compensator of the present invention can also be prepared by using a high molecular liquid crystal which provides a uniform, twisted nematic orientation of monodomain for itself without using any other optically active compound and which permits the state of such orientation to be immobilized easily. It is essential that the polymer in question have an optically active group in the molecule and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

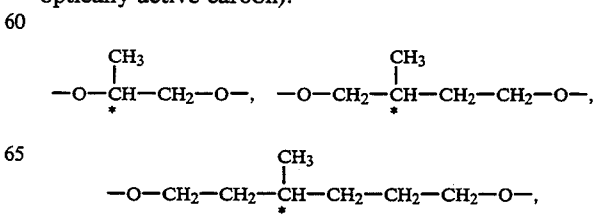

-continued

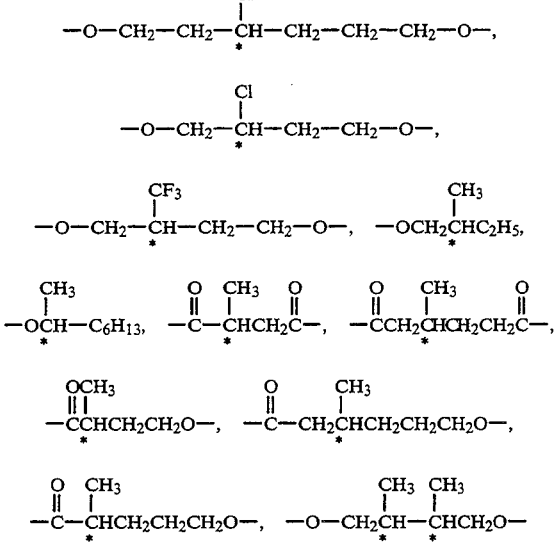

The proportion of these optically active groups in the polymers is in the range of preferably 0.1 to 50 mole %, more preferably 0.5 to 30 mole %. If the said proportion is less than 0.1 mole %, there will not be obtained a twisted structure required for the compensator, and a proportion thereof large than 50 mole % is not desirable because the orientation property would be deteriorated. The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity than 0.05 is not desirable because the strength of the resulting high molecular liquid crystal will be low, while if the intrinsic viscosity is larger than 3.0, there will arise problems such as the deterioration of orientability and an increase of the time required for orientation because of too high viscosity during the formation of liquid crystal. Also important are the glass transition points of these polyesters, which exert influence on the stability of orientation after the immobilization of orientation. The glass transition temperature is usually not lower than 0° C., preferably not lower than 20° C.

These polymers can be prepared by the foregoing melt polycondensation process or acid chloride process.

The following are typical examples of the liquid crystalline polymer used in the present invention described above. Polymers represented by:

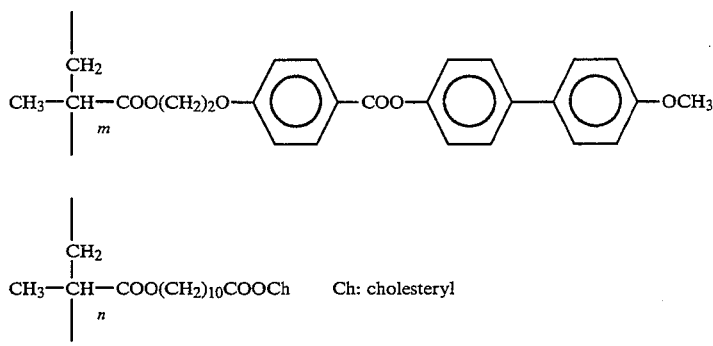

m/n=usually 99.9/0.1 to 70/30, preferably 99.5/0.5 to 80/20, more preferably 99/1 to 90/10

Polymers represented by:

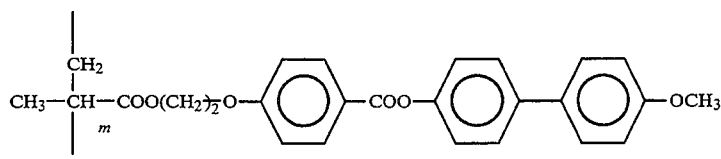

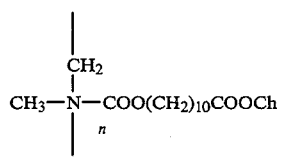

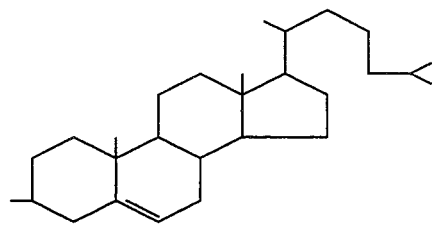

Ch: cholesteryl m/n=usually 99.9/0.1 to 70/30, preferably 99.5/0.5 to 80/20, more preferably 99/1 to 90/10
Polymers represented by:

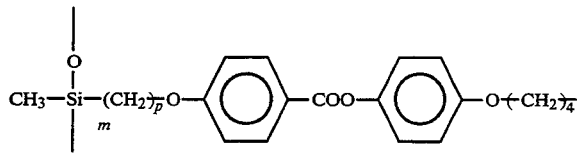

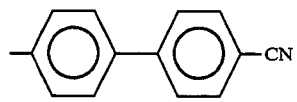

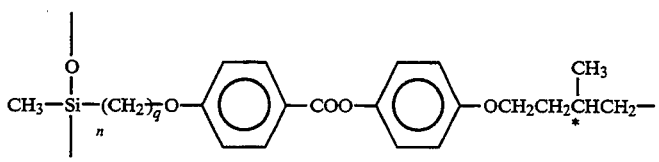

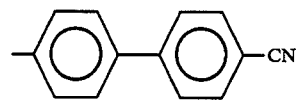

m/n=usually 99.9/0.1 to 70/30, preferably 99.5/0.5 to 90/10, more preferably 99/1 to 95/5
p, q: integer of 2 to 20
Polymers represented by:

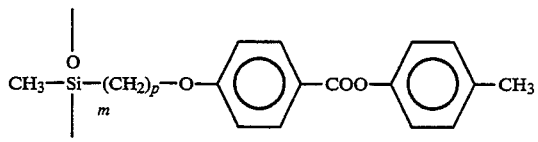

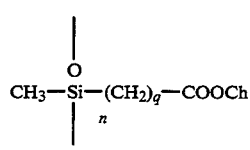

m/n=usually 99.9/0.1 to 70/30, preferably 99.5/0.5 to 90/10, more preferably 99/1 to 95/5
p, q: integer of 2 to 20
Polymers represented by:

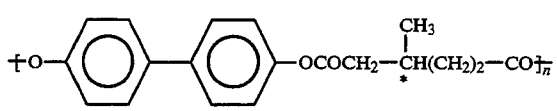

m/n=usually 99.9/0.1 to 60/20, preferably 99.5/0.5 to 80/20, more preferably 99/1 to 90/10
Polymers represented by:

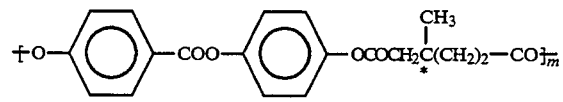

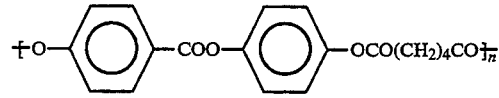

m/n=0.5/99.5 to 70/30, preferably 1/99 to 10/90
Polymers represented by:

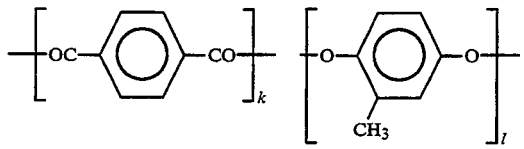

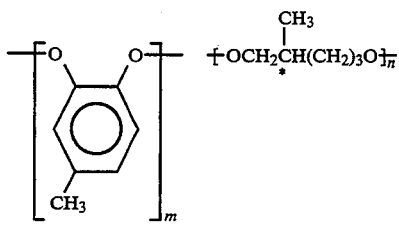

k=l+m+n
k/n=99.5/0.5 to 60/20, preferably 99/1 to 70/30
l/m=5/95 to 80/20
Polymers represented by:

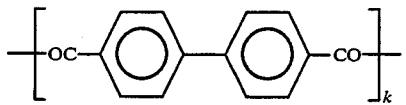

-continued

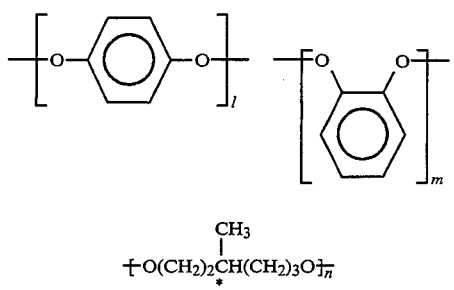

k=l+m+n
k/n=99.5/0.5 to 60/20, preferably 90/1 to 70/30
l/m=5/95 to 80/20
Polymers mixtures represented by:
(A)

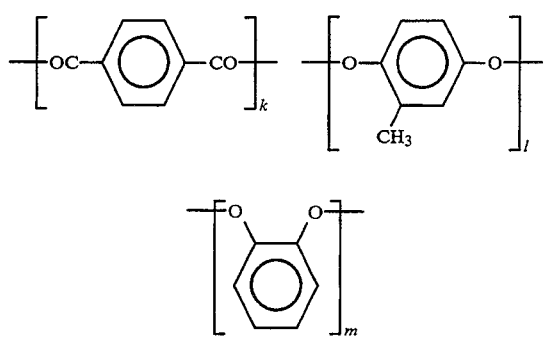

(B)

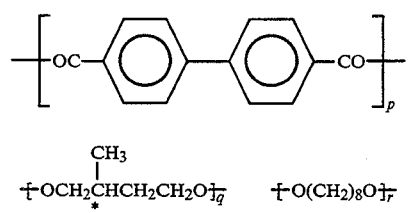

(A)/(B)=usually 99.9/0.1 to 50/50 (weight ratio), preferably 99.5/0.5 to 70/30, more preferably 99/1 to 80/20
k=l +m
l/m=75/25 to 25/75
p=q +r
r/q=80/20 to 20/80
Polymer mixtures represented by:
(A)

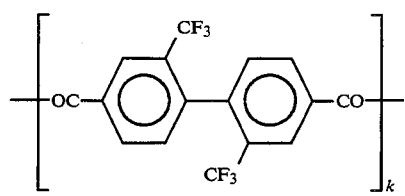

-continued

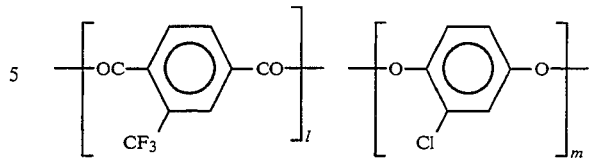

(B) cholesteryl benzoate
(A)/(B)=usually 99.9/0.1 to 50/50 (weight ratio), preferably 99.5/0.5 to 70/30, more preferably 99/1 to 80/20
m=k+l
k/l=80/20 to 20/80
Polymer mixtures represented by:
(A)

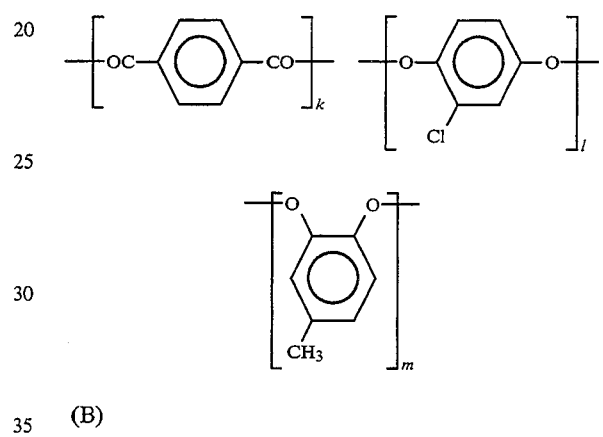

(B)

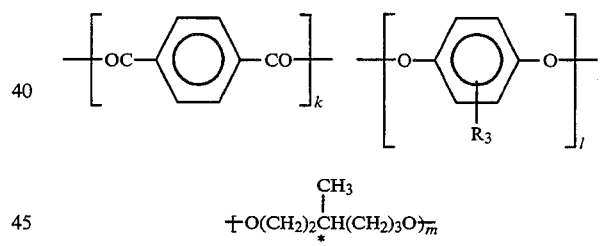

(A)/(B)=usually 99.5/0.1 to 60/20 (weight ratio), preferably 99.5/0.5 to 70/30, more preferably 99/1 to 80/20
k=l+m
l/m=25/75 to 75/25
p=q +r
p/r=20/80 to 80/20

The mark * represents an optically active carbon.

The surface active agent used in the present invention will now be described. In the method of making a compensator for a liquid crystal display device according to the present invention, the surface active agent plays an extremely important role in forming a compensation layer having a film thickness held in a high degree of uniformity. According to the manufacturing method of the present invention, a solution of the liquid crystalline polymer is applied onto an orientating substrate by any of various application methods, followed by drying for removal of the solvent used. This process has the greatest influence on the accuracy of film thickness. This coating and drying process is a general process used in various industrial fields. Particularly in the field of magnetic tapes or photographic films, a highly accurate coating is performed using a very advanced technique. Even with such a technique, however, it is extremely difficult to maintain the uniformity of film thickness within ±1% stably with respect to the total film thickness.

Having made various studies about a method for overcoming such difficulty, the present inventors found out that by incorporating a surface active agent into the liquid crystalline polymer solution, an effective leveling effect was created at the time of coating and drying to afford a film having a high uniformity of film thickness.

It is necessary for the surface active agent used in the present invention to have a high compatibility with the solvent for dissolving the liquid crystalline polymer and also with the liquid crystalline polymer itself. It is desirable that the use of the surfactant in a predetermined amount permit controlling the surface tension of the solution freely.

As preferred examples of surfactants employable in the present invention there are mentioned anionic surfactants such as alkylcarboxylic acid metal salts, potassium alkylphosphates and carboxylic acid type high-molecular surfactants, nonionic surfactants such as polyoxyethylene alkyl ethers, polyoxyethylene alkyl phenyl ethers, oxyethylene-oxypropylene block copolymer, sorbitan fatty acid esters, polyoxyethylene sorbitan fatty acid esters, fatty acid monoglyceride, polyethylene glycol fatty acid esters, polyoxyethylene alkyl amines, alkylalkoxylates and alkyl group-containing (meth)acrylate oligomers, and catinonic surfactants such as alkylamine salts and quaternary ammonium salts. Above all, fluorine-containing surfactants, particularly fluorine-containing surfactants of the type in which some or all of the hydrogen atoms in oxyethylene, oxypropylene or alkyl group of surfactants have been substituted with fluorine atoms, are preferred from the standpoint of compatibility, stability and surface tension lowering ability. Examples of such fluorine-containing surfactants are perfluoroalkylcarboxylic acid metal salts (e.g. potassium salts), potassium perfluoroalkylphosphates, polyethylene glycol perfluoroalkyl fatty acid esters, perfluoroalkyl alkoxylates, and perfluoroalkyl group-containing (meth)acrylate oligomers.

The amount of the surfactant to be used differs depending on the kind of liquid crystalline polymer used and that of the solvent used, but preferably it is in the range from 0.01% to 10% by weight, more preferably 0.05% to 5% by weight, relative to the liquid crystalline polymer. If the amount of the surfactant is smaller than 0.01%, there will not be obtained a desired film uniformity improving effect, and if its amount is larger than 10%, a phase separation thereof from the liquid crystalline polymer will arise more easily. Thus, both such amounts are not desirable.

As the solvent to be used for dissolving the liquid crystalline polymer and the surfactant to prepare a coating solution there may be used any of halogenated hydrocarbons such as chloroform, dichloroethane, tetrachloroethane, trichloroethylene, tetrachloroethylene and odichlorobenzene, mixed solvents thereof with phenols, and polar solvents such as dimethylformamide, dimethylacetamide, dimethyl sulfoxide, N-methylpyrrolidone, sulfolane and cyclohexanone. The solution is used in a concentration usually in the range from 5% to 50% by weight, preferably 10% to 30% by weight, as a solids concentration including the liquid crystalline polymer and the surfactant.

How to form a compensation layer on an orientation substrate using this solution will now be described in detail. First, it is necessary to select a suitable orientation substrate according to the kind of the liquid crystalline polymer used. More specifically, it is necessary that the orientation substrate used be resistant to the solvent used in preparing the liquid crystalline polymer solution and also resistant to the temperature in a heat treatment. Further, it is desired for the orientating substrate used to have a moderate releasability for releasing the compensation layer from the substrate in a subsequent transfer process. Among the substrates exemplified previously, a glass substrate having a rubbed polyimide layer, as well as directly rubbed films or sheets of polyimides, polyether ether ketones, polyphenylene sulfides and polyethylene terephthalate, are preferred because they satisfy the above properties.

The coating solution is applied onto the orientation substrate thus selected. As the coating method there may be adopted, for example, spin coating method, roll coating method, gravure coating method, curtain coating method, slot coating method, or dipping/pulling up method. After the coating, the solvent is removed by drying, followed by heat treatment at a predetermined temperature for a predetermined time to complete a twisted nematic orientation of monodomain. For assisting the orientation based on an interfacial effect, the lower the polymer viscosity, the better, and hence the higher the temperature, the more preferably, provided a too high temperature is not desirable because it will cause an increase of cost and deterioration of the working efficiency. A certain polymer has an isotropic phase in a higher temperature region than the nematic phase, so if heat treatment is performed in this temperature region, orientation will not be obtained. Thus, it is desirable that in accordance with the characteristics of the polymer used there be performed heat treatment at a temperature of not lower than the glass transition point thereof and below the transition point to an isotropic phase. Usually, the range from 50° to 300° C. is suitable and the range from 100° to 250° C. is more suitable. The time required for obtaining a satisfactory orientation in the state of liquid crystal on the alignment film differs depending on the composition and molecular weight of the polymer used, but preferably it is in the range from 10 seconds to 100 minutes, more preferably 30 seconds to 60 minutes. If the said time is shorter than 10 seconds, the orientation obtained will be unsatisfactory, and if it is longer than 100 minutes, the transparency of the resulting compensator may be deteriorated. The same state of orientation can also be obtained by applying the polymer in a melted state onto the orientation substrate, followed by heat treatment. By performing these treatments using the liquid crystalline polymer in the present invention there can be obtained a uniform, twisted nematic orientation throughout the whole upper surface of the substrate. The surfactant plays an important role in enhancing the accuracy of such uniformity.

By subsequent cooling to a temperature below the glass transition point of the liquid crystalline polymer, the oriented state thus obtained can be fixed without impairing the orientation. Generally, in the case of using a polymer having crystal phase in a lower temperature region than the liquid crystal phase, the orientation in the state of liquid crystal will be destroyed by cooling. In the method of the present invention, such phenomenon does not occur because there is used a polymer having glass phase under the liquid crystal phase, and it is possible to fix the twisted nematic orientation completely.

The cooling rate is not specially limited. Such orientation is fixed by mere transfer from within the heating atmosphere into an atmosphere held at a temperature below the glass transition point of the liquid crystalline polymer. For enhancing the production efficiency there may be performed a forced cooling such as air cooling or water cooling. The thickness of the compensation layer after fixing of the orientation is preferably in the range from to 100 $\mu$m, more preferably 0.5 to 50 $\mu$m. If the film thickness is smaller than 0.1 $\mu$m, there will not be obtained a desired effect of compensation, and if it exceeds 100 $\mu$m, the alignment film will become less effective and it will be difficult to obtain uniform orientation.

The compensation layer on the orientation substrate thus obtained and a light transmitting substrate are stuck together using an adhesive or a pressure-sensitive adhesive. Next, the compensation layer is peeled off at the interface between it and the orientating substrate and is transferred to the light transmitting substrate side to obtain a compensator for a liquid crystal display according to the present invention.

As an example of the light transmitting substrate to be used there is mentioned a glass sheet or a plastic film having transparency and optical isotropy. More concrete examples include films of polymethyl methacrylates, polystyrenes, polycarbonates, polyether sulfones, polyphenylene sulfides, polyarylates, amorphous polyolefins, triacetyl cellulose and epoxy resins. Particularly, films of polymethyl methacrylates, polycarbonates, polyether sulfones, polyarylates, triacetyl cellulose and amorphous polyolefins are preferred. Another example of the light transmitting substrate is a polarizing film. The polarizing film is an optical element essential to liquid crystal display. If the polarizing film is used as the light transmitting substrate, there can be obtained an optical element as an integral body of both the compensation layer and the polarizing film. This is very convenient. As a further example of the light transmitting substrate used in the present invention, mention may be made of a liquid crystal display cell itself. The liquid crystal display cell uses two upper and lower glass substrates with electrodes. If the compensation layer is transferred to one or both of those glass substrates of the display cell, the glass substrate(s) per se serves as a compensator.

The adhesive or pressure-sensitive adhesive for sticking the light transmitting substrate and the compensation layer with each other is not specially limited if only it is of an optical grade. For example, there may be used an acrylic or epoxy adhesive or pressure-sensitive adhesive, or one using ethylene-vinyl acetate copolymer or rubber.

The transfer of the compensation layer to the light transmitting substrate can be done by peeling off the orientating substrate at the interface between it and the compensation layer after the bonding. As examples of the peeling method there are mentioned a mechanical method using a roll or like, a method in which the laminate is dipped in a poor solvent for all of the constituent materials, followed by mechanical separation, a method involving the application of ultrasonic wave in a poor solvent, a method in which a temperature change is created for separation by utilizing the difference in thermal expansion coefficient between the orientation substrate and the compensation layer, and a method in which the orientation substrate itself or the alignment film thereon is dissolved off. Since the peelability differs depending on the adhesion between the liquid crystalline polymer used and the orientation substrate used, there sould be adopted a method most suitable for the system used.

In this way there is obtained a compensator for a liquid crystal display device, having a three-layer structure comprising the compensation layer, the adhesive (or pressure-sensitive adhesive) layer and the light transmitting substrate, in accordance with the present invention. The compensator may be used as it is, or for protection of its surface, a protective layer formed of a transparent plastic material may be provided thereon. The compensator may be used in a combined form with another optical element such as a polarizer.

The compensator for a liquid crystal display device thus manufactured by the method of the present invention has an extremely high uniformity of film thickness and therefore its compensating performance is extremely uniform. Further, the manufacturing cost is low and the compensator is thin and light in weight. Moreover, since the light transmitting substrate can be selected in an extremely wide range, there can be obtained compensators of various performances and shapes. The compensator manufactured by the method of the present invention can be applied to color compensation and viewing angle compensation in STN liquid crystal display, TFT liquid crystal display, etc. and thus it is of an extremely great industrial value. (Examples)

The following examples are given to further illustrate the present invention, but it is to be understood that the invention is not limited thereto. The analyzing methods used in those Examples are as follows.

(1) Determination of Polymer Composition

Polymer was dissolved in deuterated chloroform or deuterated trifluoroacetic acid and the polymer composition was determined using $^1$H-NMR of 400 MHz (JNM-GX400, a product of Japan Electron Optics Laboratory Co., Ltd.).

(2) Determination of Inherent Viscosity

Determined in a mixed phenol/tetrachloroethane (60/40 weight ratio) at 30° C. using a Ubbelohde's viscometer.

(3) Determination of Liquid Crystal Phase Series

Determined by measurement using DSC (Du Pont 990 Thermal Analyzer) and observation using an optical microscope (BH2 Polarizing Microscope, a product of Olympus Optical Co., Ltd.).

(4) Determination of Uniformity in Film Thickness

The uniformity of film thickness was evaluated by measuring an in-plane distribution of optical parameters (Δn which is the product of birefringence and film thickness, and twist angle) of a sample at intervals of 5 mm. Example 1

There was prepared phenol/tetrachloroethane (60/40 weight ratio) solution containing a mixed polymer (inherent viscosity of a base polymer: 0.20, that of an optically active polymer: 0.14) shown in formula (1) and 0.5 wt %, based on the weight of the polymer, of a potassium perfluoroalkylcarboxylate type surfactant and having a solids content of 15 wt %. This solution was applied onto a rubbing-treated polyimide film having a size of 21 cm by 29 cm and a thickness of 125 $\mu$m, by means of a spin coater, then dried and heat-treated at 200° C. for 20 minutes, followed by cooling to fix the resulting structure. Twist angle of this compensation layer was −230° and Δnd was 840 nm. Onto the compensation layer was then stuck a polyether sulfone film having a size of 21 cm by 29 cm and a thickness of 100 μm, using an acrylic adhesive. Next, the polyimide film and the compensation layer were separated from each other slowly along the interface thereof using roll. The compensation layer (liquid crystalline polymer layer) of the compensator thus fabricated was measured for in-plane optical parameter distribution to find that variations in in-plane Δnd were within ±0.6% for 840 nm.

Figure 2:
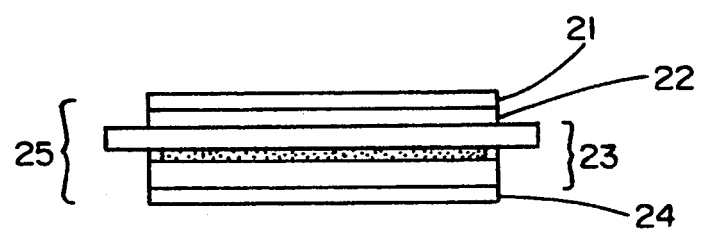
FIG. 2 is a sectional view of a liquid crystal cell used in working examples of the present invention.
Figure 3:
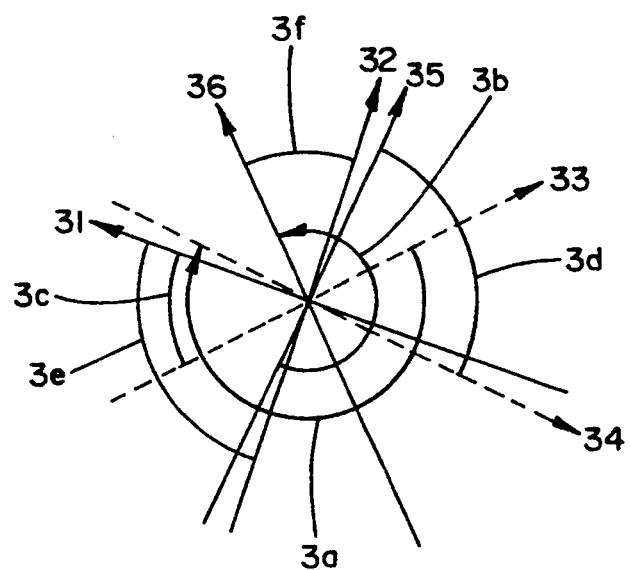
FIG. 3 is a diagram showing a correlation of optical axes of materials which constitute the liquid crystal cell used in working examples of the present invention.

Then, in accordance with the arrangement shown in FIG. 2, the compensator 22 was placed on the upper surface of an STN liquid crystal cell 23 of 1/200 duty drive having a twist angle of 230° and Δnd of 870 nm and a polarizing plate was stuck thereon. In the liquid crystal cell 25 thus fabricated, the direction of the upper polarizing plate 21 and that of the lower polarizing plate 24, the direction of the upper electrode substrate and that of the lower electrode substrate, and the molecular orienting direction in the compensation layer, are as shown in FIG. 3. The angle between the polarization axis of the upper polarizing plate and that of the lower polarizing plate is 90°; the angle between the direction of the lower polarizing plate and the rubbing direction of the lower electrode substrate is 45°; the angle between the rubbing direction of the upper electrode substrate and the molecular orientation direction of the surface of the compensation layer in contact with the upper electrode substrate is 90°; and the angle between the surface of the compensation layer in contact with the upper polarizing plate and a transmission axis of the upper polarizing plate is 25°.

Display colors of this liquid crystal cell were complete black and white colors and there was obtained a display of high quality and high uniformity, having a contrast of 60 and a luminance of 100 cd/m².

Comparative Example 1

A compensator for an STN liquid crystal display was fabricated in the same way as in Example 1 except that the surfactant was not used. The twist angle and Δnd of this compensator were −230° and 820 nm, which were the same as in the compensator obtained in Example 1, but in-plane variations in Δnd of the compensation layer were within ±1.1% and thus larger than that in Example 1.

Then, in the same manner as in Example 1, this compensator was put on an STN liquid crystal cell and the display performance was checked to find that contrast and luminance were 58 and 100 cd/m² respectively. Thus, there was not a great difference from the values obtained in Example 1. But when the display color was set in black color, there was observed a slight unevenness in comparison with Example 1.

EXAMPLE 2

There was prepared a solution in tetrachloroethane containing an optically active polymer of formular (2) (inherent viscosity: 0.15, Tg=81° C.) and 0.3 wt %, based on the weight of the polymer, of a perfluoroalkyl methacrylate oligomer and having a solids content of 20 wt %. This solution was applied onto a glass plate having a size of 21 cm by 29 cm and a thickness of 1.1 mm and having a rubbing-treated polyvinyl alcohol layer, by a spin coating method, and then dried to remove the solvent, followed by cooling for fixing the resulting structure to form a compensation layer (liquid crystalline polymer layer). Onto this compensation layer was then stuck a polycarbonate film having a size of 21 cm by 29 cm and a thickness of 120 μm, using an acrylic optical adhesive. The laminate thus formed was immersed in water for 1 hour, then the orientating substrate and the compensation layer were separated from each other slowly along the interface thereof, followed by drying.

The compensation layer of the compensator thus fabricated had a twist angle of −230° and Δnd of 838 nm, and in-plane variations in Δnd were within ±0.7% for 838 nm.

A test cell was assembled in accordance with the arrangement shown in FIG. 2 so that the compensation layer of the compensator was located on the liquid cell side and so that optical axes are arranged as in FIG. 3.

Display colors of this liquid crystal cell were complete black and white colors. Contrast and luminance were 59 and 100 cd/m², respectively, with little unevenness observed in black display.

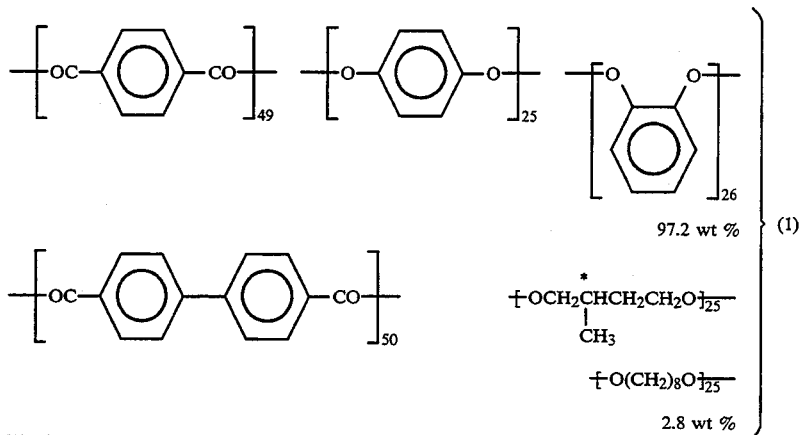

The * mark represents an optically active carbon.

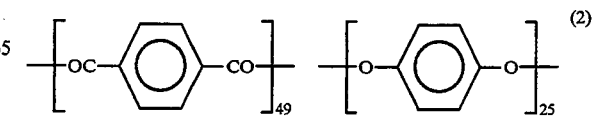

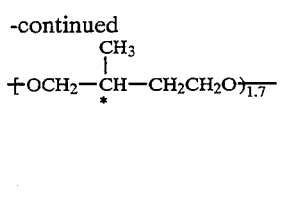

COMPARATIVE EXAMPLE 2

A compensator was fabricated in the same way as in Example 2 except that the surfactant was not used. Twist angle and Δnd of this compensator were −229° and 820 nm, respectively, which were almost the same as in Example 1. But in-plane variations in Δnd of the compensation layer formed were ±1.3% and thus larger than that in Example 2.

Then, in the same manner as in Example 1, this compensator was put on an STN liquid crystal cell and display performance was checked to find that contrast and luminance were 58 and 100 cd/m² respectively, and thus there was no difference. But when the display color was set in black color, a slight unevenness was observed in comparison with Example 2.

EXAMPLE 3

There was prepared a 30 wt % solution in N-methylpyrrolidone containing a mixed polymer (inherent viscosity of a base polymer: 0.21, Tg=60° C., inherent viscosity of an optically active polymer: 0.18) of formula (3) and 1.5 wt %, based on the weight of the polymer, of a polyoxyethylene-polyoxypropylene block copolymer surfactant. Separately, a surface-polished polyether ether ketone sheet having a size of 21 cm by 29 cm and a thickness of 2 mm was subjected directly to a rubbing treatment to obtain a orientating substrate. The coating solution was then applied onto the orientating substrate, then dried and thereafter heat-treated at 150° C. for 20 minutes, followed by cooling for fixing the resulting structure to form a compensation layer. Onto this compensation layer was then stuck a polycarbonate film with a pressure-sensitive adhesive, having a size of 21 cm by 29 cm and a thickness of 75 μm. After standing 1 hour, the orientating substrate and the compensation layer were separated from each other slowly along the interface thereof using roll.

Twist angle and Δnd of the compensation layer (liquid crystalline polymer layer) of the compensator thus fabricated were −229° and 839 nm, respectively. As a result of having measured an in-plane distribution of optical parameters, it turned out that in-plane variations in Δnd were ±0.6% for 839 nm.

A test cell was assembled in accordance with the arrangement shown in FIG. 2 so that the compensation layer of the compensator was located on the liquid cell side and so that optical axes were arranged as in FIG. 3.

Display colors of this liquid crystal cell were complete black and white. Contrast and luminance were 59 and 100 cd/m² respectively, and there was observed little unevenness in black color display.

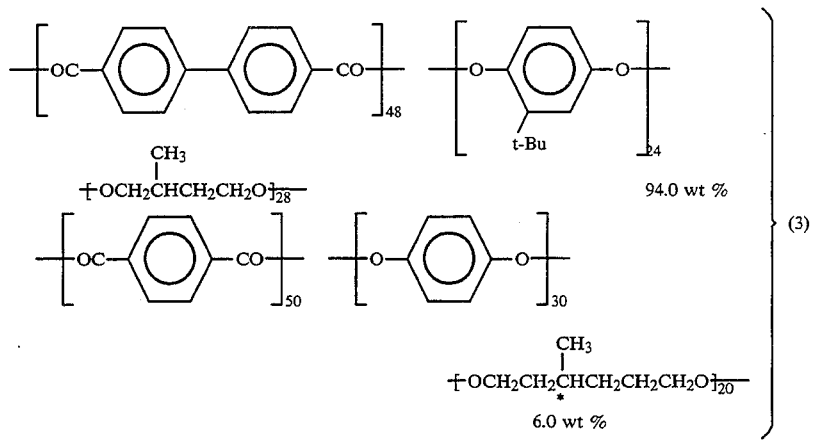

COMPARATIVE EXAMPLE 3

A compensator was fabricated in the same way as in Example 3 except that the surfactant was not used. Twist angle and Δnd of this compensator were −231° and 840 nm, respectively, which were almost the same as in Example 1. However, in-plane variations in Δnd of the compensation layer formed were ±1.3% and thus larger than that in Example 3.

In the same manner as in Example 3, this compensator was put on an STN liquid crystal cell and display performance was checked to find that contrast and luminance were 60 and 100 cd/m² respectively, thus showing little difference from those in Example 3. But when the display color was set in black color, a slight unevenness was observed in comparison with Example B.

EXAMPLE 4

There was prepared a 20 wt % solution in dimethylformamide containing an optically active polymer (inherent viscosity: 0.20) of formula (4) and 0.8 wt %, based on the weight of the polymer, of a perfluoroalkyl alkoxylate type surfactant and having a solids content of 20 wt %. Separately, a polyethylene terephthalate film having a size of 21 cm by 29 cm and a thickness of 50 μm was subjected directly to a rubbing treatment to obtain an orientation substrate. Then, the coating solution was applied onto the orientation substrate by a curtain coating method, then dried and thereafter heat-treated at 100° C. for 20 minutes, followed by cooling for fixing the resulting structure to form a compensation layer. Twist angle and Δnd of this compensation layer were −229° and 837 nm, respectively.

As a result of having measured an in-plane distribution of optical parameters of the compensation layer (liquid crystalline polymer layer) of the compensator thus fabricated, it turned out that in-plane variations in Δnd were within ±0.5% for 837 nm.

A test cell was assembled in accordance with the arrangement shown in FIG. 2 so that the compensation layer of the compensator was located on the liquid crystal cell side and so that optical axes were arranged as in FIG. 3.

Display colors of the liquid crystal cell were complete black and white. Contrast and luminance were 55 and 100 cd/m² respectively There was observed little unevenness in black color display.

(4)

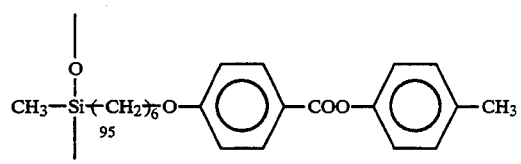

    Ch; cholesteryl

EXAMPLE 5

A 15 wt % solution was prepared in the same way as in Example 2 except that there was used a polymer similar to that used in Example 2 and having a composition of terephthalic acid units 50 mole %, hydroquinone units 16 mole %, catechol units 16 mole % and optically active methylbutanediol units 18 mole %. This solution was applied continuously onto a continuous polyphenylene sulfide film having a rubbing-treated polyimide layer on the film surface 30 cm wide by 100 μm thick, by a bottom feed three-reverse roll coating method and then dried. The thus-coated film was then heat-treated at 220° C. continuously. Thereafter, the compensation layer formed was transferred onto a triacetyl cellulose film with a pressure-sensitive adhesive and having a thickness of 75 μm, a width of 30 cm. Further, a triacetyl cellulose film was laminated onto the compensation layer to form a protective layer. From the compensator film thus formed were then cut out a total of 20 samples each having a size of 10 cm by 10 cm at a rate of one sample per meter. With respect to each of the samples, optical parameters of the compensation layer and an in-plane film thickness distribution were measured.

The twenty samples ranged from 140 to 142 nm in Δnd and from 400° to 403° in twist angle, and their in-plane Δnd variations were within ±1%, thus proving that the compensator film obtained above was extremely uniform.

EXAMPLE 6

The coating solution prepared in Example 4 was applied onto a continuous polyethylene terephthalate film having a rubbing-treated surface 50 μm thick by 30 cm wide, by a slot coating method and then the solvent was removed by drying. The thus continuously coated film was heat-treated at 100° C. continuously and thereafter the compensation layer formed was transferred onto a triacetyl cellulose film with a pressure-sensitive adhesive and having a thickness of 75 μm, a width of 30 cm. Further, a triacetyl cellulose film was laminated onto the compensation layer to form a protective layer. From the compensator film thus fabricated were then cut out a total of 20 samples each having a size of 10 cm by 10 cm at a rate of one sample per meter. Then, with respect to each of the samples, optical parameters of the compensation layer and an in-plane film thickness distribution were measured.

The twenty samples ranged from 550 to 555 nm in Δnd and from −150° to −152 ° 3n twist angle, a·d their in-plane Δnd variations were within the range of ±1%.

EXAMPLE 7

A 15 wt % solution in a mixed p-chlorophenol/tetrachloroethane (weight ratio 80/20) solvent containing a mixed polymer (inherent viscosity of a base polymer: 0.18, Tg=72° C.) of formula (5) and 0.25 wt %, based on the weight of the polymer, of a perfluoroalkyl acrylate oligomer surfactant was prepared. As an orientating substrate there was used a directly rubbed polyimide film having a size of 21 cm by 29 cm, and the coating solution was applied onto the polyimide film by a spin coating method, then dried and heat-treated at 150° C. for 40 minutes, followed by cooling for fixing the resulting structure to form a compensation layer. Twist angle and Δnd of the compensation layer were −90° and 520 nm, respectively, and variations in parameters were within ±1%.

A polarizing film with a pressure-sensitive adhesive was stuck on the compensation layer. Thereafter, the polyimide film and the compensation layer were separated from each other slowly along the interface thereof, allowing the compensation layer to be transferred to the polarizing film side.

The compensator thus formed was then put on a twisted nematic (TN) liquid crystal cell having a twist angle of 90° and Δnd of 560 nm in such a manner that the compensation layer was located on the cell side. In this case, optical axes were set so that the angle between the rubbing direction of an upper electrode substrate of the liquid crystal and the molecular orientation direction of the compensation layer surface in contact with the upper electrode substrate was 90° and the angle between two upper and lower polarizing films was also 90°.

As a result of having checked a compensating effect of this test cell, it turned out that there was obtained a complete black color high in uniformity as compared with the case where the compensator was not used.

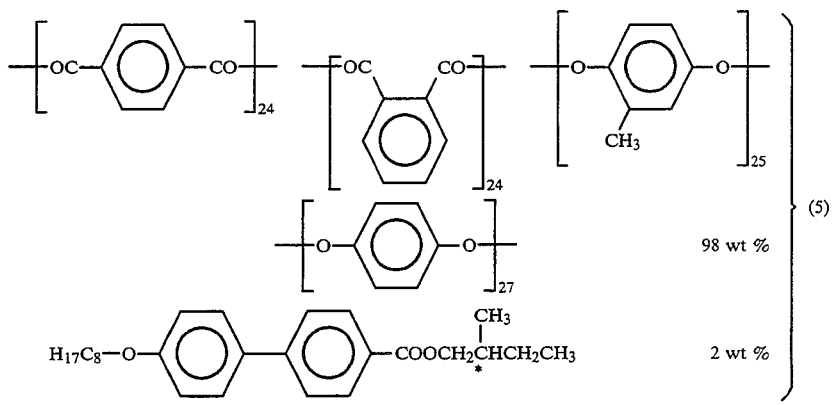

The * mark represents an optically active carbon.

COMPARATIVE EXAMPLE 4

A compensator was fabricated in the same way as in Example 7 except that the surfactant was not used. Twist angle and Δnd of this compensator were −90° and 522 nm, respectively, which were almost the same as in Example 7. But in-plane variations in Δnd of the compensation layer were with ±1.5% and thus larger than in Example 7.

In the same manner as in Example 7, this compensator was put on a TN liquid crystal cell and display performance was checked to find that the uniformity in black color display was somewhat inferior.

(Effect of the Invention)

According to the manufacturing method of the present invention, by using a surfactant at the time of applyuing a liquid crystalline polymer onto an orientation substrate, the uniformity in the film thickness of the resulting compensation layer of the liquid crystalline polymer is obtained.

What is claimed is:

1. A method of making a compensator for a liquid crystal display device, comprising applying a solution containing a liquid crystalline polymer onto an orientation substrate, then allowing the liquid crystalline polymer to be oriented, and thereafter transferring the resulting layer of the liquid crystalline polymer on the orientation substrate onto a light transmitting substrate, said solution containing the liquid crystalline polymer having incorporated therein 0.01% to 10% by weight of a surface active agent relative to the liquid crystalline polymer.

2. A method as set forth in claim 1, wherein said surface active agent is a fluorine-containing surface active agent.

3. A method as set forth in claim 1, wherein said liquid crystalline polymer exhibits a twisted nematic orientation in a liquid crystal state and assumes a glassy state at a temperature below a transition point to a liquid crystalline state thereof.

4. A method as set forth in claim 1, wherein said solution has a solid concentration in the range from 5% to 50% by weight.

5. A method as set forth in claim 1, wherein said solution contains a solvent which is selected from the group consisting of halogenated hydrocarbons, mixed solvents thereof with phenols, and polar solvents.

6. A method as set forth in claim 1, wherein the surface active agent is selected from the group consisting of anionic surfactants, nonionic surfactants and cationic surfactants.

7. A method as set forth in claim 2, wherein the fluorine-containing surface active agent contains oxyethylene, oxypropylene or alkyl groups in which some or all of the hydrogen atoms contained in the oxyethylene, oxypropylene or alkyl groups have been substituted by fluorine atoms.

8. A method as set forth in claim 7, wherein said fluorine-containing surface active agent is selected from the group consisting of perfluoroalkylcarboxylic acid metal salts, potassium perfluoroalkylphosphates, polyethylene glycol perfluoroalkyl fatty acid esters, perfluoroalkyl alkoxylates, perfluoroalkyl group-containing methacrylate oligomers and perfluoroalkyl group-containing acrylate oligomers.

* * * * *

UNITED STATES PATENT AND TRADEMARK OFFICE
CERTIFICATE OF CORRECTION

PATENT NO.   : 5,413,657
DATED        : May 9, 1995
INVENTOR(S)  : Teruaki Yamanashi, et al.

It is certified that error appears in the above-indentified patent and that said Letters Patent is hereby corrected as shown below:

```
Column 21, line 66:   "60/20"   should read --60/40--
Column 22, line 59:   "60/20"   should read --60/40--
Column 23, line 16:   "60/20"   should read --60/40--
Column 24, line 48:   "60/20"   should read --60/40--
Column 27, line 13:   after "from"   insert --0.1--
Column 28, line 68:   "20"   should read --40--
Column 29, line 33:   "25"   should read --45--
Column 31, line 34:   "820"   should read --840--
Column 32, line 41:   "And"   should read -- Δ nd--

Column 32, line 51:   "B"   should read --3--
Column 33, line 16:   after "respectively"   insert
--.--
```

Signed and Sealed this

Sixteenth Day of January, 1996

Attest:

BRUCE LEHMAN

Attesting Officer          Commissioner of Patents and Trademarks